United States Patent [19]

Crane

[11] Patent Number: 5,225,950
[45] Date of Patent: Jul. 6, 1993

[54] GIMBAL HAVING STIFFNESS PROPERTIES

[75] Inventor: Peter Crane, Minneapolis, Minn.

[73] Assignee: Seagate Technology, Inc., Scotts Valley, Calif.

[21] Appl. No.: 660,685

[22] Filed: Feb. 25, 1991

[51] Int. Cl.⁵ .............................. G11B 5/48
[52] U.S. Cl. .................................... 360/104
[58] Field of Search ........................ 360/104

[56] References Cited

U.S. PATENT DOCUMENTS

| | | | |
|---|---|---|---|
| 3,581,298 | 5/1971 | Billawala | 340/174.1 |
| 3,931,641 | 1/1976 | Watrous | 360/104 |
| 4,058,843 | 11/1977 | Gyi | 360/103 |
| 4,197,566 | 4/1980 | Suzuki et al. | 360/103 |
| 4,245,267 | 1/1981 | Herman | 360/104 |
| 4,651,243 | 3/1987 | Daste et al. | 360/104 |
| 4,740,854 | 4/1988 | Shibuya et al. | 360/104 |
| 4,792,875 | 12/1988 | Ohdaira | 360/104 |
| 4,807,070 | 2/1989 | Isozaki et al. | 360/104 |
| 4,811,143 | 3/1989 | Ohashi et al. | 360/105 |
| 4,835,642 | 5/1989 | Furukawa et al. | 360/105 |
| 4,868,694 | 9/1989 | Hagen | 360/104 |
| 4,875,121 | 10/1989 | Tanaka et al. | 360/129 |
| 4,903,156 | 2/1990 | Hayashi et al. | 360/104 |
| 4,954,919 | 9/1990 | Yamada | 360/104 |

Primary Examiner—A. J. Heinz
Attorney, Agent, or Firm—Kinney & Lange

[57] ABSTRACT

A gimbal for supporting an air bearing slider proximate a rotating disc. The gimbal comprises a flexure seat with first and second opposite ends. A first pair of long, thin beams extend between the first end and the second end. A first cross beam connects the first pair of long, thin beams at the first end such that the beams are spaced at the first end by a first distance. A second cross beam connects the first pair of long, thin beams at the second end such that the beams are spaced at the second end by a second distance, shorter than the first distance. A central pad is connected to the first cross beam and is suspended between the first pair of beams for connection to the air bearing slider.

29 Claims, 4 Drawing Sheets

GIMBAL HAVING STIFFNESS PROPERTIES

BACKGROUND OF THE INVENTION

The present invention relates to a gimbal for supporting a hydrodynamic air bearing slider over a rotating disc within a storage system. More specifically, this invention relates to a gimbal having improved stiffness properties.

In a storage system, such as a magnetic disc drive, a plurality of discs rotate about a common axis. Each disc in the drive includes a recording surface with a plurality of concentric data tracks. An actuator arm assembly supports a hydrodynamic air bearing slider close to the rotating disc and positions the slider over selected data tracks. The slider carries a magnetic transducer for communicating with individual bit positions on the rotating magnetic disc.

A load arm is connected between the actuator arm assembly and the slider. The load arm supplies a downward force (preload force) that counteracts a hydrodynamic lifting force developed by the air bearing slider. The interaction between the preload force and the hydrodynamic lifting force maintains a nearly constant slider flying height.

A gimbal is positioned between the load arm and the slider. The gimbal resiliently supports the slider and allows it to pitch and roll while it follows the topography of the rotating disc. As such, the gimbal is a critical element in a magnetic disc drive unit.

SUMMARY OF THE INVENTION

The present invention is a gimbal for resiliently supporting a hydrodynamic air bearing slider proximate a rotating disc. The gimbal has improved stiffness properties that make the gimbal effective for supporting a slider having very small dimensions. It has been found that minimizing the size of the slider provides various advantages. For example, a slider having dimensions which are fifty percent of the current industry standard reduces by a factor of four the wafer processing overhead for each slider. Thus, the smaller sliders are cheaper to manufacture. The mass of the slider is reduced by a factor of eight, and the pitch and roll inertias of the slider are reduced by a factor of thirty-two. This leads to improved dynamic performance of the slider and increased disc drive reliability due to reduced air bearing clearance (flying height) variations during data track accessing.

A disadvantage of the slider having fifty percent dimensions is that the stiffness of the air bearing is reduced. The vertical stiffness is reduced by approximately a factor of two, while the pitch and roll stiffnesses are reduced by approximately factors of four. Reducing the stiffness of the air bearing increases the sensitivity of the slider flying height to errors in the forces applied to the air bearing by the load arm. The load arm forces take the form of preload, pitch torsion and roll torsion. The error in preload force is governed by the stiffness of the load arm. The errors in pitch and roll torsions are governed by the pitch and roll stiffnesses of the gimbal.

The gimbal of the present invention reduces errors in the pitch and roll torsions by reducing the pitch and roll stiffnesses. The gimbal includes a first pair of long, thin beams which extend between a first end and a second end. A first cross beam connects the first pair of long, thin beams at the first end such that the beams are spaced at the first end by a first distance. A second cross beam connects the first pair of long, thin beams at the second end such that the beams are spaced at the second end by a second distance, shorter than the first distance. A central pad is connected to the first cross beam and is suspended between the first pair of beams for supporting the air bearing slider.

In one embodiment, the gimbal further includes a second pair of long, thin beams disposed about the first pair of long, thin beams and extending from the second cross beam toward the first end, generally parallel to the first pair of long, thin beams. A third cross beam connects the second pair of long, thin beams at the first end.

The first pair of long, thin beams and the first and second cross beams together form an inner triangular-shaped, cantilevered support member. The second pair of long, thin beams and the second and third cross beams together form an outer triangular-shaped, cantilevered support member. The outer support member is generally concentric with the inner support member. In another embodiment, the gimbal includes a plurality of cycles of triangular-shaped cantilevered support members with each support member being supported at its proximal end by a distal end of an adjacent and concentric support member.

The gimbal of the present invention reduces pitch and roll stiffnesses by maximizing the length of each pair of long, thin beams (the stiffness of each beam is inversely proportional to the cube of its length). The pitch and roll stiffnesses are further reduced by providing a plurality of cycles of triangular-shaped, cantilevered support members, such as the inner and outer support members.

In addition to reduced pitch and roll stiffnesses, the gimbal has various other beneficial stiffness properties. First, the gimbal has a relatively high stiffness in the direction of the disc radius, which reduces "off-track" data errors. Off-track data errors are caused by variations in the positioning of the transducer over selected data tracks. These variations cause the transducer to read from or write to adjacent data tracks.

The gimbal is attached to the load arm such that the pairs of long, thin beams are oriented generally perpendicular to the data tracks. This orientation maximizes the radial stiffness of the flexure because each long, thin beam is placed in either tension or compression rather than bending when the load arm swings to position the slider. The radial stiffness is further increased by minimizing the overall length of the cross beams which are perpendicular to the radial direction to minimize the bending of the cross beams. The triangular shape of each support member minimizes the total length of the cross beams.

Second, the gimbal has a high angular stiffness in a plane defined by the disc surface which prevents a dynamic mode of "slider yawing" from affecting servo loop performance. The servo loop controls a servo motor which rotates the actuator assembly to position the slider over the various data tracks on the disc surface.

Third, the gimbal has sufficient stiffness in the direction of the disc tangential velocity, which resists excessive deformation of the gimbal during takeoff. As the disc begins to rotate, it drags a thin film of air between the disc surface and the air bearing. This thin film of air develops positive pressure along the air bearing and causes the slider to lift and to fly several micro inches above the disc surface. The lifting force produced by the positive pressure is known as a hydrodynamic lifting force. The angular orientation of the long, thin beams increases the tangential stiffness to resist excessive deformation and stress during takeoff. The central pad provides a surface with sufficient area on which to glue-bond the slider to the gimbal such that the glue bond is not overstressed during takeoff.

Finally, the gimbal has overall dimensions which are small enough to fit into the disc drive without wasting space.

DETAILED DESCRIPTION OF THE PREFERRED EMBODIMENTS

The present invention is a gimbal for supporting a hydrodynamic air bearing slider over a rotating magnetic medium. The gimbal has improved stiffness properties relative to gimbals of the prior art. The improved stiffness properties make the gimbal effective for use with a slider having very small dimensions.

Figure 1:
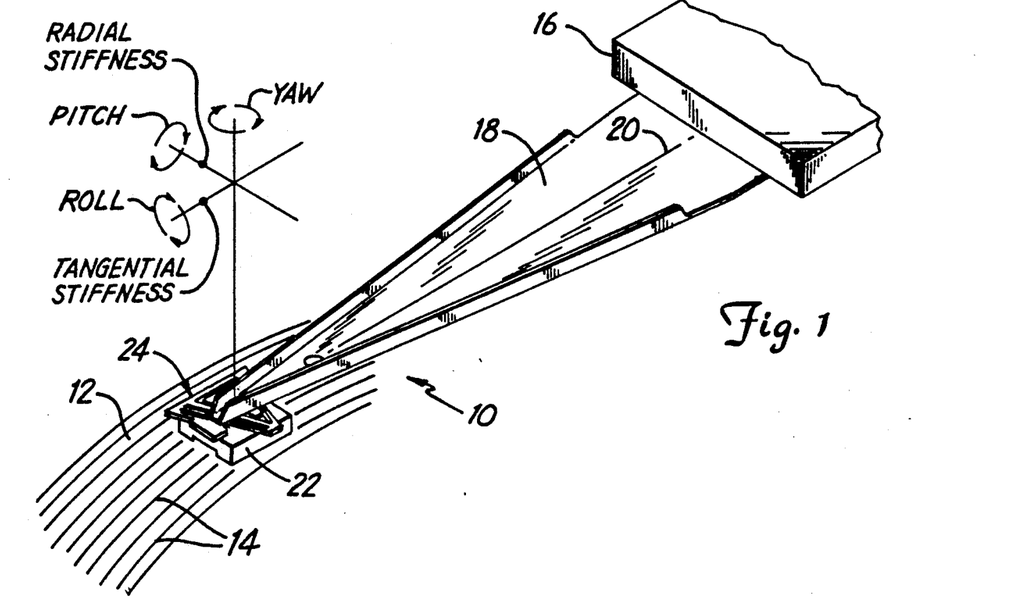
FIG. 1 is a perspective view of a load arm carrying an air bearing disc head slider proximate a rotating magnetic disc, in accordance with the present invention.

FIG. 1 shows an actuator arm assembly 10 positioned over a disc 12. Disc 12 includes a recording surface with a plurality of data tracks 14. Actuator arm assembly 10 includes base portion 16 and load arm 18 with longitudinal axis 20. Load arm 18 carries a hydrodynamic air bearing slider 22 close to the recording surface on disc 12. Slider 22 carries at least one transducer (not shown) which reads data from or writes data to individual bit positions in data tracks 14. When necessary, actuator arm assembly 10 rotates to reposition slider 22 over selected data tracks 14. A gimbal (flexure) 24 connects slider 22 to load arm 18. Gimbal 24 is spot-welded to load arm 18 while slider 22 is attached to the gimbal by an adhesive. As disc 12 rotates, gimbal 24 allows slider 22 to pitch and roll while following the topography of the disc.

Figure 2:
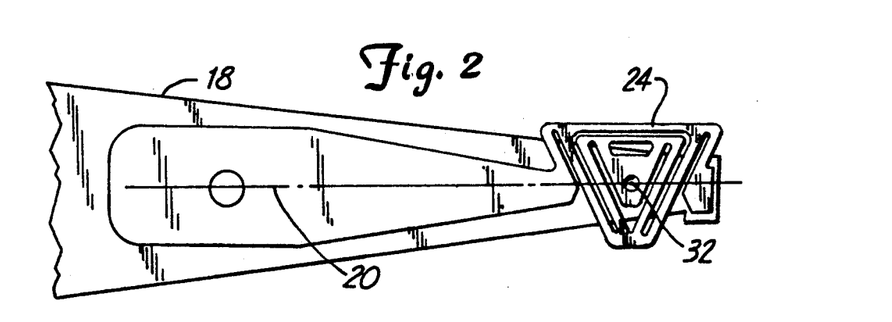
FIG. 2 is a bottom plan view of the gimbal of the present invention mounted to the load arm shown in FIG. 1.
Figure 3:
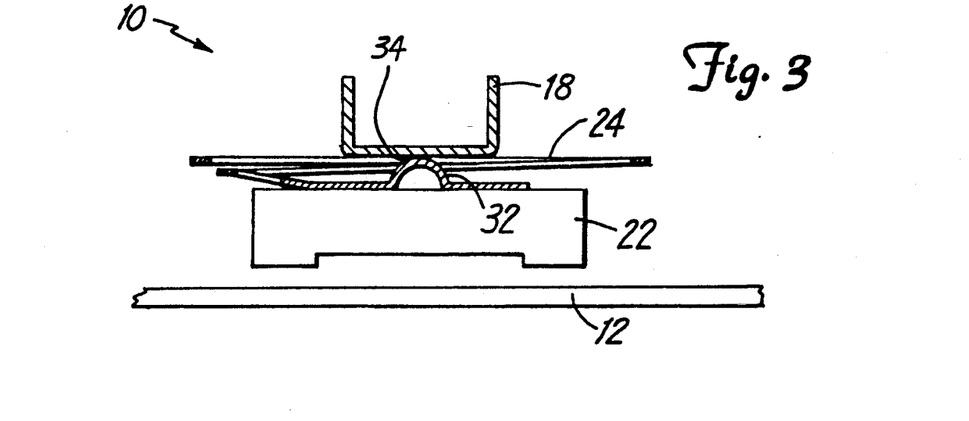
FIG. 3 is an end view of the load arm shown in FIG. 1 with a gimbal in accordance with the present invention positioned between the load arm and the slider.

FIG. 2 is a bottom plan view of the inventive gimbal 24 which is connected to load arm 18. Gimbal 24 includes a gimbal dimple 32 which contacts load arm 18 at a contact point 34 (shown in FIG. 3). Slider 22 pivots about contact point 34 as it pitches and rolls to accommodate variations in topography across disc 12.

Figure 4:
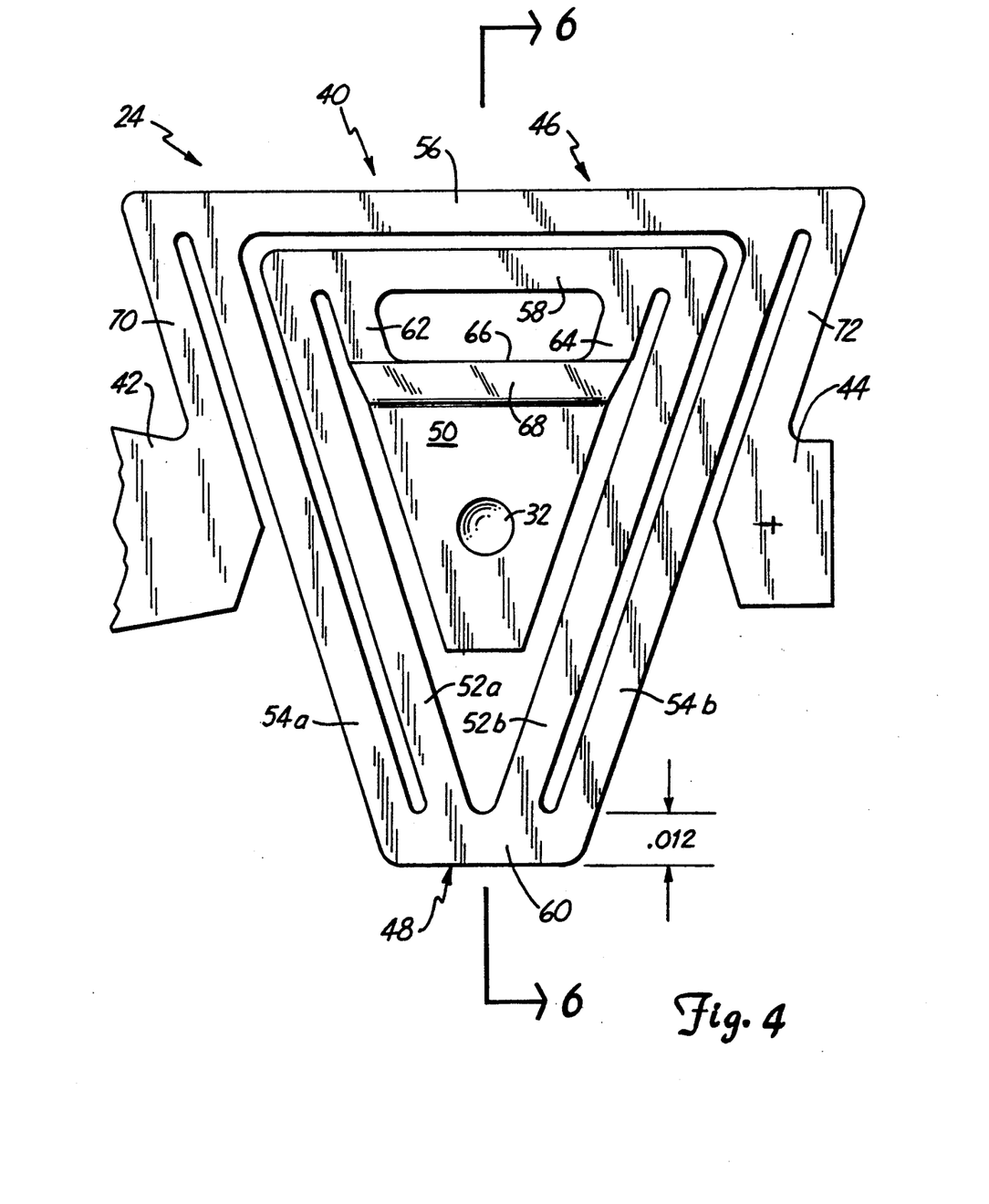
FIG. 4 is a top plan view of the gimbal shown in FIGS. 2 and 3.

FIG. 4 is a top plan view of the inventive gimbal 24. Gimbal 24 includes flexure seat 40 and outer support tabs 42 and 44. Outer support tabs 42 and 44 are configured for connection to load arm 18, as shown in FIG. 2. Flexure seat 40 includes opposite ends 46 and 48, central pad 50, a first pair of long, thin beams 52a and 52b, a second pair of long, thin beams 54a and 54b, and cross beams 56, 58 and 60. Beams 52a, 52b and 54a, 54b are also known as webs, with each pair of webs forming one "cycle".

The first pair of long, thin beams 52a and 52b extend between opposite ends 46 and 48 of flexure seat 40. Beams 52a and 52b are connected to cross beam 58 such that the beams are spaced at end 46 by a first distance. Beams 52a and 52b are connected to cross beam 60 such that the beams are spaced at end 48 by a second distance, smaller than the first distance. With this configuration, beams 52a and 52b converge together from end 46 to end 48.

Central pad 50 is supported by cross beam 58 through legs 62 and 64. Central pad 50 is configured for adhesive connection with slider 22 (shown in FIGS. 1 and 3). Central pad 50 includes preformed bend 66. Preformed bend 66 is shown and discussed in greater detail with reference to FIG. 6 below.

The first pair of beams 52a and 52b and cross beams 58 and 60 together form an inner triangular-shaped, cantilevered support member with a proximal end and a distal end. Cross beam 60 forms the proximal end while cross beam 58 forms the distal end. The inner support member is also referred to as a first cycle of webs.

The second pair of long, thin beams 54a and 54b are disposed about beams 52a and 52b and extend between cross beams 56 and 60, generally parallel to the first pair of long, thin beams 52a and 52b. The second pair of long, thin beams 54a and 54b and the cross beams 56 and 60 together form an outer triangular-shaped, cantilevered support member with a proximal end and a distal end. Cross beam 56 forms the proximal end while cross beam 60 forms the distal end. The outer support member is also referred to as a second cycle of webs. In this configuration, the inner and outer support members are generally concentric with the proximal end of the inner support member being connected to the distal end of the outer support member.

Legs 70 and 72 connect flexure seat 40 to outer support tabs 42 and 44 such that the tabs are disposed about beams 54a and 54b. Once tabs 42 and 44 are connected to load arm 18 (shown in FIGS. 1, 2 and 3) the tabs support central pad 50, and thus slider 22, through beams 54a, 54b, 52a and 52b.

Although the embodiment shown includes an inner and an outer triangular-shaped, cantilevered support member, any number of support members (or cycles) may be used in accordance with the present invention. For example, in one alternative embodiment, flexure seat 40 includes only a single triangular-shaped, cantilevered support member formed by long, thin beams 54a and 54b and cross beams 56 and 60. In this embodiment, central pad 50 is connected directly to cross beam 60. Beams 52a and 52b are not present. In another alternative embodiment, flexure seat 40 includes a plurality of triangular-shaped, cantilevered support members with each support member being connected at its proximal end to the distal end of an adjacent, concentric support member. In all embodiments, the outermost support member is connected at its proximal end to the outer support tabs 42 and 44 through legs 70 and 72.

Figure 5:
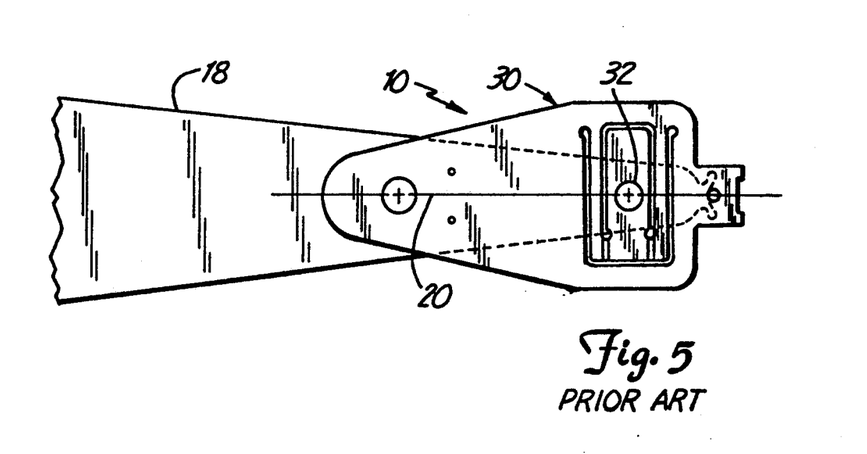
FIG. 5 is a bottom plan view of a presently used gimbal mounted to the load arm shown in FIG. 1.

FIG. 5 is a bottom plan view of a currently used gimbal 30 which is connected to load arm 18. Similar to the inventive gimbal 24, the currently used gimbal 30 includes dimple 32 which contacts load beam 18 at contact point 34 (shown in FIG. 3). The inventive gimbal 24 is substituted for the currently used gimbal 30.

The currently used gimbal 30 was designed for use with a slider having dimensions similar to the current industry standard (approximately 160 mils long ×125 mils wide×34 mils thick). However, when used with a slider having dimensions fifty percent of the industry standard, the overall performance of the gimbal decreases. Because the smaller slider has reduced air bearing stiffnesses, the sensitivity of the air bearing clearance to errors in the pitch and roll torsions applied by gimbal 30 is increased. The errors in pitch and roll torsions are governed by the pitch and roll stiffnesses of gimbal 30.

The gimbal of the present invention has improved stiffness properties over gimbals of the prior art. These stiffness properties make the present invention effective for use with sliders having dimensions which are fifty percent of the current industry standard. The various axes about which stiffness is measured are shown in FIG. 1. These axes are the same regardless of the gimbal used. Table I below compares the various stiffnesses of the current gimbal 30 with the various stiffnesses of the inventive gimbal 24. Table I is based on gimbals having a material thickness of 1.5 mils.

TABLE I

Comparison of Performance Parameters of the Disclosed, Inventive Gimbal and the Current Gimbal

| DIRECTION | CURRENT GIMBAL | INVENTIVE GIMBAL |
|---|---|---|
| Pitch Stiffness | 3.6E-3 in-lbf/rad | 1.05E-3 in-lbf/rad |
| Roll Stiffness | 1.7E-3 in-lbf/rad | 0.45E-3 in-lbf/rad |
| Yaw Stiffness | 2.65 in-lbf/rad | 0.81 in-lbf/rad |
| Radial Stiffness | 2450 lbf/in | 1031 lbf/in |
| Tangential Stiffness | 75.1 lbf/in | 64.6 lbf/in |

The comparison of the pitch and roll stiffnesses shows that the inventive gimbal 24 has substantially less stiffness than the current gimbal 30 shown in FIG. 5. This reduction in stiffness is achieved by maximizing the length of the long, thin beams 52a, 52b, 54a and 54b and by the cylical support structure formed by the cantilevered support members. The stiffness of each beam is inversely proportional to the cube of its length.

The frequency of slider yawing mode is governed by the following formula:

$$\text{Freq} = \sqrt{\frac{\text{yaw stiffness}}{\text{slider rotational inertia}}}$$

With fifty percent dimensions, the smaller slider has a rotational inertia reduced by a factor of 32 from the current industry standard. Therefore, the yaw stiffness can be reduced to provide a similar frequency of the slider yawing mode between the inventive gimbal 24 and the current gimbal 30. However, the yaw stiffness is high enough to prevent slider yawing from affecting the servo control loop performance.

The radial stiffness of the inventive gimbal 24 was maintained as closely as possible to the radial stiffness of the current gimbal 30. This reduces "off-track" data errors caused by variations in the radial positioning of the transducer over selected data tracks 14 (shown in FIG. 1). The radial stiffness was maximized by orienting the long, thin beams 52a, 52b, 54a and 54b substantially perpendicular to data tracks 14 and longitudinal axis 20 (or parallel with the radius of disc 12). This places beams 52a, 52b, 54a and 54b in either tension or compression rather than bending when load arm 18 swings to position slider 22.

The angular orientation of beams 52a, 52b, 54a and 54b with the triangular shape increases the tangential stiffness of gimbal 30 by reducing the torsional effect of tangential forces on the beams. Further, the radial stiffness is also improved with the triangular shape because shortened cross beam 60 is less susceptible to bending. The tangential stiffness is sufficient to resist excessive deformation during takeoff (when disc 12 begins to rotate causing slider 22 to lift and to fly above the disc surface).

Central pad 50 has a sufficient area available for glue-bonding slider 22 to gimbal 24, such that the glue bond will not be overstressed during takeoff. In one embodiment, the glue bond area for gimbal 24 is approximately 2400 square mils, while the glue bond area for the current gimbal 30 is approximately 3060 square mils.

The appropriate preload force applied by load arm 18 on the inventive gimbal 24 is fifty percent that of the current gimbal 30. In one embodiment, the preload force on gimbal 30 is 6.5 grams and 3.5 grams on gimbal 24. Assuming a slider/disc friction coefficient of 1.00, the nominal shear stress at takeoff is 3.21 psi on the inventive gimbal 24 (with the smaller preload), while the nominal shear stress of takeoff is approximately 4.68 psi on the current gimbal 30 with the larger preload. Thus, the nominal shear stress at takeoff for the inventive gimbal 24 is reduced.

Figure 6:
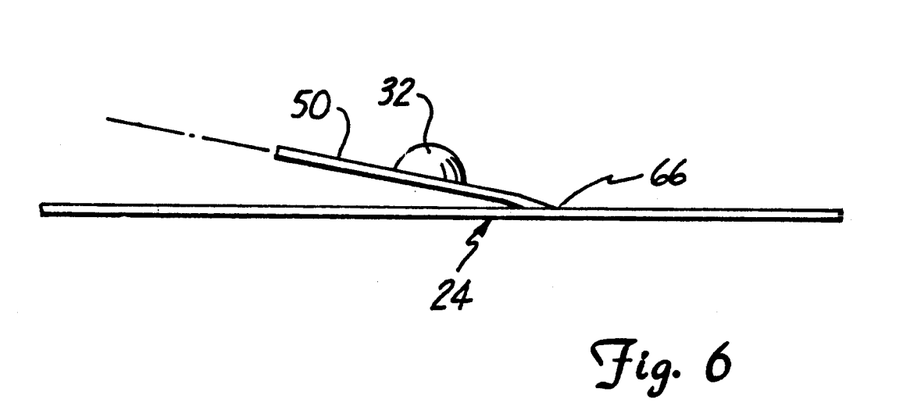
FIG. 6 is a cross sectional view of the gimbal taken along lines 6—6 of FIG. 4.

FIG. 6 is a cross sectional view of gimbal 24 taken along line 6—6 of FIG. 4. Gimbal 24 includes central pad 50 with dimple 32. In one embodiment, central pad 50 is preformed with bend 66 before gimbal 24 is welded to load arm 18 (shown in FIG. 2). Bend 66 allows a nominally zero roll torsion in the finished assembly.

Figure 7:
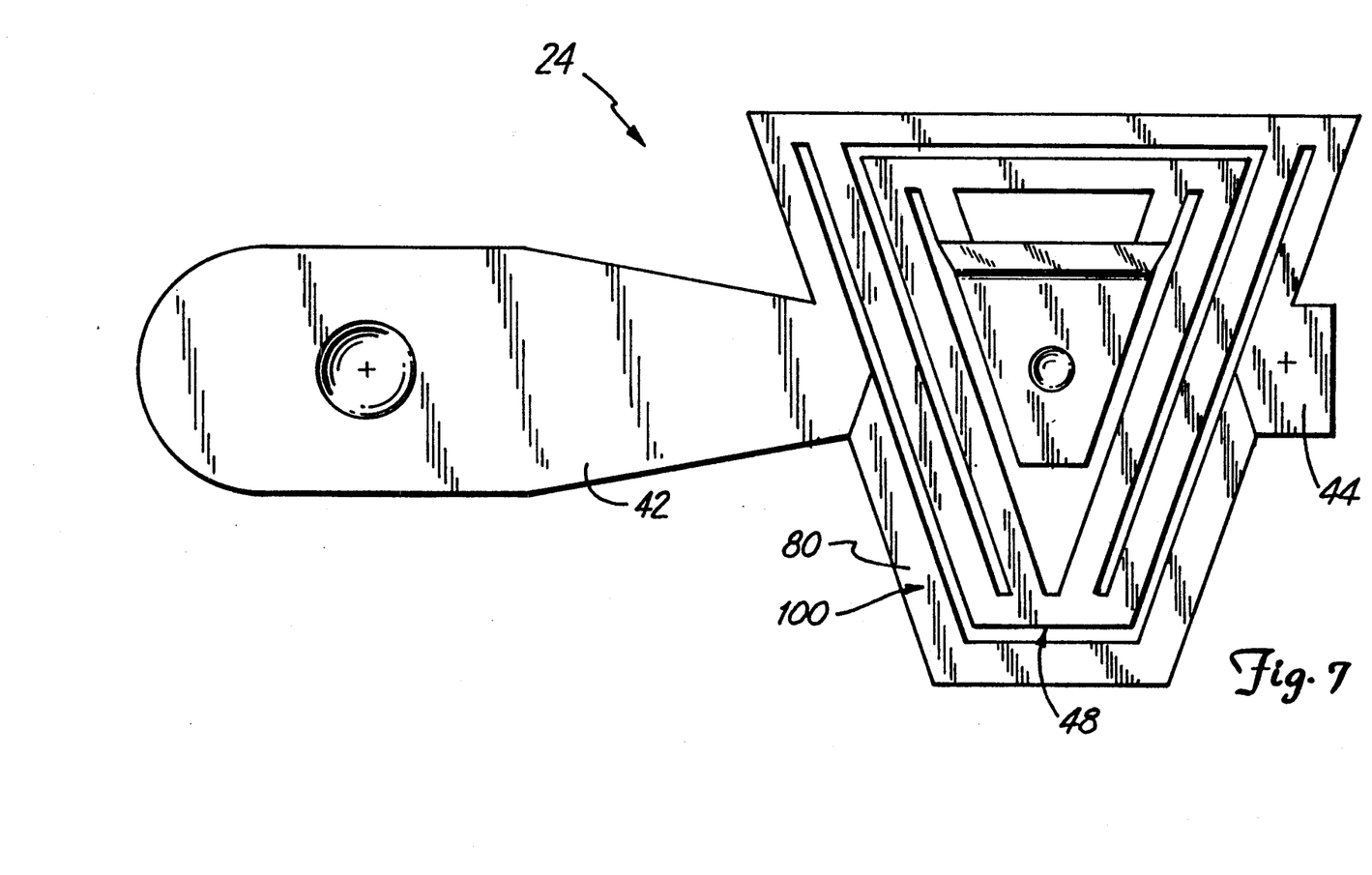
FIG. 7 is a top plan view of a gimbal having a fixturing web, in accordance with the present invention.

FIG. 7 is a top plan view of gimbal 24 in an alternative embodiment. In this embodiment, gimbal 24 includes a fixturing web 80 which extends between outer support tabs 42 and 44, around end 48. When gimbal 24 is welded to load arm 18, it is secured to a fixture (not shown). The fixture tends to distort gimbal 24 causing the gimbal to be welded in a bent condition. When the welds cool, they tend to warp the gimbal even further. Fixturing web 80 reduces distortion of gimbal 24 when it is welded to load arm 18 and thereby reduces variation in pitch and roll torsions.

The gimbal of the present invention has a flexure seat with a unique triangular-shaped configuration that maximizes the length of the beams oriented perpendicular to the data tracks while minimizing the length of the beams oriented parallel to the data tracks. This configuration provides the inventive gimbal with dynamic performance which is suitable for use with extremely small air bearing disc head sliders. The reduced pitch and roll stiffnesses limit the error in the forces applied by the gimbal to the slider so that the slider can follow the topography of the disc while maintaining a nearly constant flying height.

Although the present invention has been described with reference to preferred embodiments, workers skilled in the art will recognize that changes may be made in form and detail without departing from the spirit and scope of the invention. For example, the gimbal may be configured for use with a linear actuator by rotating the flexure seat by 90° such that the long, thin beams remain generally parallel with the disc radius.

I claim:

1. A gimbal for supporting an air bearing slider proximate a rotating disc, the gimbal comprising:
   a flexure seat with first and second opposite ends;
   a first pair of beams extending between the first and second ends and converging together from the first end to the second end;
   a first cross beam extending between the first pair of beams at the first end;
   a second cross beam extending between the first pair of beams at the second end;
   a second pair of beams disposed about the first pair of beams and connected to the second cross beam at the second end, the second pair of beams extending from the second end toward the first end, generally parallel to the first pair of beams;
   a third cross beam extending between the second pair of beams at the first end;
   a central pad supported by the first pair of beams for supporting the air bearing slider; and
   outer support means configured for supporting the central pad through the first and second pair of beams.

2. The gimbal of claim 1 wherein the central pad is suspended between the first pair of beams by a pair of spaced legs which are connected to the first cross beam.

3. The gimbal of claim 1 wherein the central pad includes a dimple protrusion.

4. The gimbal of claim 1 wherein the outer support means includes first and second tab members which are connected to the third cross beam and disposed about the second pair of beams.

5. The gimbal of claim 4 and further comprising a fixture member extending from the first tab member to the second tab member, around the second end.

6. The gimbal of claim 1 wherein:
   a flexure seat with the first pair of beams and the first and second cross beams together form an inner triangular-shaped, cantilevered support member; and
   the second pair of beams and the second and third cross beams together form an outer triangular-shaped, cantilevered support member which is concentric with the inner triangular-shaped support member.

7. A gimbal for supporting an air bearing slider proximate a rotating disc, the gimbal comprising:
   a flexure seat with first and second opposite ends;
   a first pair of long, thin beams extending between the first end and the second end;
   a first cross beam connecting the first pair of long, thin beams at the first end such that the beams are spaced at the first end by a first distance;
   a second cross beam connecting the first pair of long, thin beams at the second end such that the beams are spaced at the second end by a second distance, shorter than the first distance;
   a second pair of long, thin beams disposed about the first pair of long, thin beams and extending from the second cross beam toward the first end, generally parallel to the first pair of long, thin beams;
   a third cross beam connecting the second pair of long, thin beams at the first end; and
   a central pad connected to the first pair of beams for supporting the air bearing slider.

8. The gimbal of claim 7 wherein the central pad is suspended between the first pair of beams by a pair of spaced legs which are connected to the first cross beam.

9. The gimbal of claim 7 wherein the central pad includes a dimple protrusion.

10. The gimbal of claim 7 and further comprising tab means disposed about the first and second pairs of long, thin beams and connected to the third cross beam for supporting the central pad through the first and second pairs of long, thin beams.

11. The gimbal of claim 10 and further comprising a fixture member extending around the second end, between the tab means.

12. The gimbal of claim 7 wherein:
   the first pair of long, thin beams and the first and second cross beams together form an inner triangular-shaped, cantilevered support member; and
   the second pair of long, thin beams and the second and third cross beams together form an outer triangular-shaped, cantilevered support member which is concentric with the inner triangular-shaped support member.

13. A rotary actuator arm assembly for supporting an air bearing slider proximate a rotating disc having generally concentric data tracks, the assembly comprising:
   a load arm having a longitudinal axis which is generally parallel to the data tracks; and
   a gimbal attached between the load arm and the slider, the gimbal comprising:
      a flexure seat with first and second opposite ends;
      a first pair of straight, long, thin beams extending from the first end to the second end in a direction generally perpendicular to the data tracks and to the longitudinal axis of the load beam;
      a first cross beam connecting the first pair of long, thin beams at the first end such that the beams are spaced at the first end by a first distance;
      a second cross beam connecting the first pair of long, thin beams at the second end such that the beams are spaced at the second end by a second distance, shorter than the first distance; and
      a central pad connected to the first cross beam and suspended between the first pair of beams for attachment to the air bearing slider.

14. The rotary actuator arm assembly of claim 13 wherein the central pad is suspended between the first pair of beams by a pair of spaced legs which are connected to the first cross beam.

15. The rotary actuator arm assembly of claim 13 wherein the central pad includes a dimple protrusion having an apex in point contact with the load arm.

16. The rotary actuator arm assembly of claim 13 wherein the gimbal further comprises:
   a second pair of straight, long, thin beams disposed about the first pair of straight, long, thin beams and extending from the second cross beam toward the first end; and
   a third cross beam connecting the second pair of long, thin beams at the first end.

17. The rotary actuator arm assembly of claim 16 wherein the gimbal further comprises tab means connected to the third cross beam and disposed about the first and second pairs of long, thin beams at the longitudinal axis for providing connection surfaces between the gimbal and the load arm, the tab means supporting the central pad through the first and second pairs of long, thin beams.

18. The rotary actuator arm assembly of claim 17 wherein the gimbal further comprises fixture means extending around the second end, between the tab means for reducing distortion of the gimbal when it is attached to the load arm and for increasing accuracy of attachment.

19. A gimbal configured for connection between a disc head slider and a load arm in a storage system, the gimbal comprising:
- a plurality of concentric triangular-shaped, cantilevered support members which include an innermost support member and an outermost support member, wherein each support member comprises a proximal end, a distal end and a pair of converging, long, thin flexure beams, and wherein each support member is supported at its proximal end by the distal end of the next, adjacent support member;
- a central pad connected to the distal end of the innermost support member and suspended between the pair of long, thin flexure beams of the innermost support member for connection with the slider; and
- tab means connected to the proximal end of the outermost support member and disposed about the pair of long, thin flexure beams of the outermost support member for connection to the load arm.

20. The gimbal of claim 19 wherein the central pad includes a dimple protrusion having an apex in point contact with the load arm.

21. The gimbal of claim 19 and further comprising fixture means extending between the tab means, around the distal end of the outermost support member for reducing distortion of the gimbal when it is attached to the load arm and for increasing accuracy of attachment.

22. A gimbal configured for connection between a disc head slider and a load arm in a storage system, the gimbal comprising:
- a plurality of concentric cantilevered support members which include an innermost support member and an outermost support member, wherein each support member comprises a proximal end, a distal end and converging flexure beams, and wherein each support member is supported at its proximal end by the distal end of the next, adjacent support member;
- a central pad connected to the distal end of the innermost support member and suspended between the flexure beams of the innermost support member for connection with the slider; and
- tab means connected to the outermost support member for connection to the load arm.

23. A gimbal for supporting an air bearing slider proximate a rotating disc, the gimbal comprising:
- a flexure seat with first and second opposite ends;
- a first pair of beams extending between the first and second ends and converging together from the first end to the second end;
- a first cross beam extending between the first pair of beams at the first end;
- a central pad suspended between the first pair of beams by a pair of spaced legs which are connected to the first cross beam for supporting the air bearing slider; and
- outer support means configured for supporting the central pad through the first pair of beams.

24. A gimbal for supporting an air bearing slider proximate a rotating disc, the gimbal comprising:
- a flexure seat with first and second opposite ends;
- a first pair of long, thin beams extending between the first end and the second end;
- a first cross beam connecting the first pair of long, thin beams at the first end such that the beams are spaced at the first end by a first distance;
- a second cross beam connecting the first pair of long, thin beams at the second end such that the beams are spaced at the second end by a second distance, shorter than the first distance; and
- a central pad suspended between the first pair of beams by a pair of spaced legs which are connected to the first cross beam for supporting the air bearing slider.

25. A rotary actuator arm assembly for supporting an air bearing slider proximate a rotating disc having generally concentric data tracks, the assembly comprising:
- a load arm having a longitudinal axis which is generally parallel to the data tracks; and
- a gimbal attached between the load arm and the slider, the gimbal comprising:
  - a flexure seat with first and second opposite ends;
  - a first pair of long, thin beams extending between the first end and the second end in a direction generally perpendicular to the data tracks;
  - a first cross beam connecting the first pair of long, thin beams at the first end such that the beams are spaced at the first end by a first distance;
  - a second cross beam connecting the first pair of long, thin beams at the second end such that the beams are spaced at the second end by a second distance, shorter than the first distance; and
  - a central pad suspended between the first pair of beams by a pair of spaced legs which are connected to the first cross beam for supporting the air bearing slider.

26. A rotary actuator arm assembly for supporting an air bearing slider proximate a rotating disc having generally concentric data tracks, the assembly comprising:
- a load arm having a longitudinal axis which is generally parallel to the data tracks; and
- a gimbal attached between the load arm and the slider, the gimbal comprising:
  - a flexure seat with first and second opposite ends;
  - a first pair of long, thin beams extending between the first end and the second end in a direction generally perpendicular to the data tracks;
  - a first cross beam connecting the first pair of long, thin beams at the first end such that the beams are spaced at the first end by a first distance;
  - a second cross beam connecting the first pair of long, thin beams at the second end such that the beams are spaced at the second end by a second distance, shorter than the first distance; and
  - a central pad connected to the first cross beam and suspended between the first pair of beams for supporting the air bearing slider, the central pad having a dimple protrusion with an apex in point contact with the load arm.

27. A rotary actuator arm assembly for supporting an air bearing slider proximate a rotating disc having generally concentric data tracks, the assembly comprising:
- a load arm having a longitudinal axis which is generally parallel to the data tracks; and
- a gimbal attached between the load arm and the slider, the gimbal comprising:
  - a flexure seat with first and second opposite ends;
  - a first pair of long, thin beams extending between the first end and the second end in a direction generally perpendicular to the data tracks;
  - a first cross beam connecting the first pair of long, thin beams at the first end such that the beams are spaced at the first end by a first distance;

a second cross beam connecting the first pair of long, thin beams at the second end such that the beams are spaced at the second end by a second distance, shorter than the first distance;

a second pair of long, thin beams disposed about the first pair of long, thin beams and extending from the second cross beam toward the first end;

a third cross beam connecting the second pair of long, thin beams at the first end; and a central pad connected to the first cross beam and suspended between the first pair of beams for supporting the air bearing slider.

28. The rotary actuator arm assembly of claim 27 wherein the gimbal further comprises tab means connected to the third cross beam and disposed about the first and second pairs of long, thin beams at the longitudinal axis for providing connection surfaces between the gimbal and the load arm, the tab means supporting the central pad through the first and second pairs of long, thin beams.

29. The rotary actuator arm assembly of claim 28 wherein the gimbal further comprises fixture means extending around the second end, between the tab means for reducing distortion of the gimbal when it is attached to the load arm and for increasing accuracy of attachment.

* * * * *